J. H. MERRILL.
Breech-Loading Fire-Arm.
No. { 54, / 1,159. }
Reissued Mar. 26, 1861.
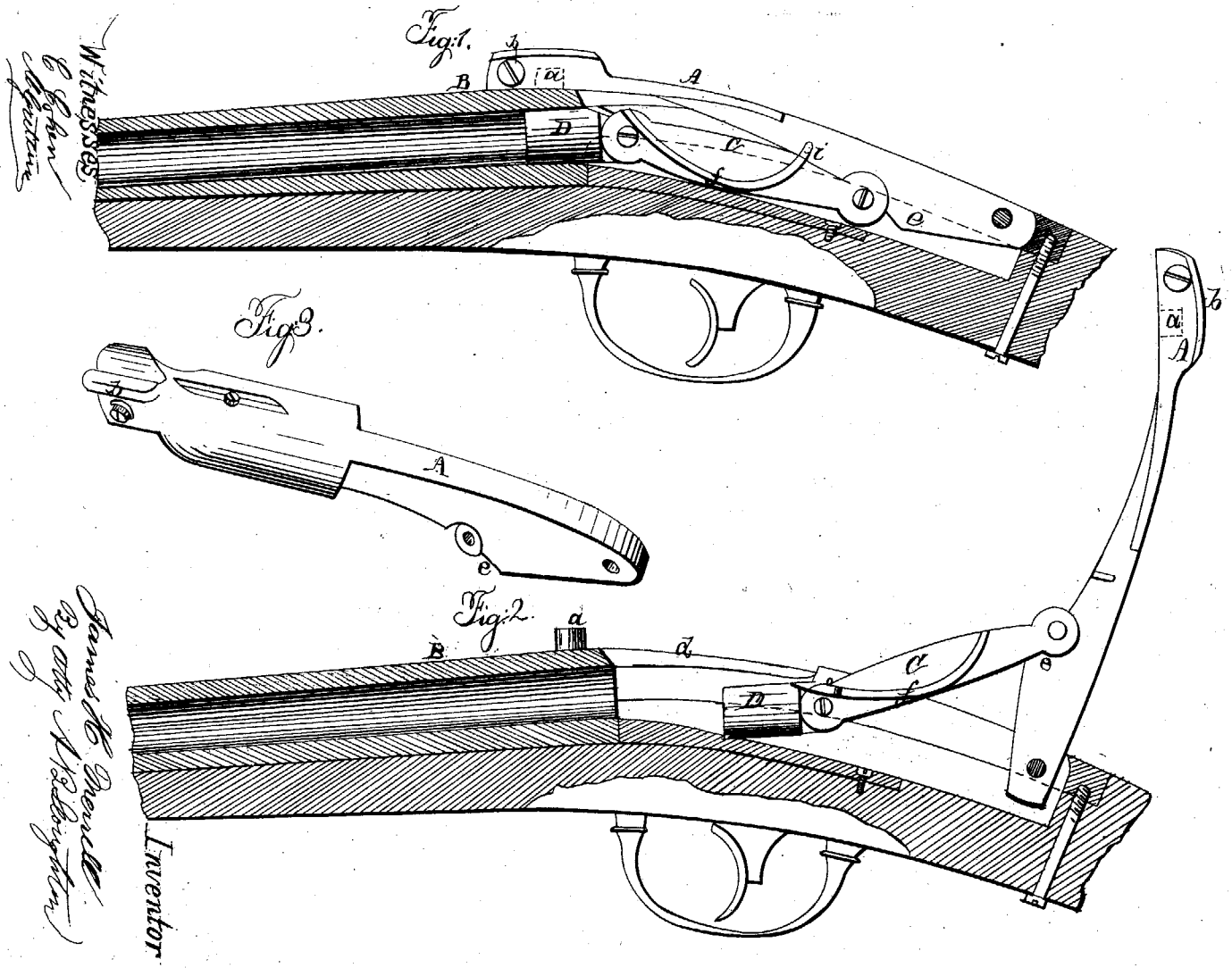
N. PETERS, PHOTO-LITHOGRAPHER, WASHINGTON, D. C.

UNITED STATES PATENT OFFICE.

THE MERRILL PATENT FIRE ARM MANUFACTURING COMPANY, OF BALTIMORE, MARYLAND, ASSIGNEE OF JAMES H. MERRILL.

IMPROVEMENT IN FIRE-ARMS.

Specification forming part of Letters Patent No. 20,954, dated July 20, 1858; Reissue No. 1,159, dated March 26, 1861.

DIVISION D.

*To all whom it may concern:*

Be it known that JAMES H. MERRILL, of the city of Baltimore and State of Maryland, did invent certain new and useful Improvements in Breech-Loading Fire-Arms; and the following is a full, clear, and exact description of the same, reference being had to the accompanying drawings, making a part of this specification, in which—

Figures 1 and 2 represent longitudinal sections through portions of the gun, and showing its parts in two positions. Fig. 3 represents a perspective view of the lever for actuating the breech-plug.

In the use of breech-loading guns cartridges are absolutely indispensable to make the arm a useful one. The "Jenks Gun," as it is termed and known, has many good properties; but, owing to its being loaded by loose powder and ball, many thousands of them in the hands of the Government or of individuals are of comparatively little value. JAMES H. MERRILL proposed to take the Jenks gun as he found it, and without reconstructing the gun generally, but simply altering some of its parts, to convert it, at a very small expense, into a breech-loading cartridge-gun. To construct an entire new gun capable of receiving a cartridge at the breech might not involve so much invention, as the mechanic, knowing exactly what he wants and what he is about to make, and being unrestricted as to space, provides beforehand for all such contingencies; but to take a gun already constructed for loose powder and ball loading, and to adapt its parts, without an entire change of them, so as to receive a cartridge inserted horizontally in rear of the bore, instead of a loose charge at right angles to the bore, does involve much study, invention, and a high degree of mechanical skill, the result of which is to be able to convert an arm now comparatively useless to the Government into one highly valuable, and particularly applicable to the present wants of the service. The invention of JAMES H. MERRILL therefore consists in converting what is known as the "Jenks Gun" from a loose powder and ball breech-loader to a cartridge breech-loader, by which means a gun now almost useless can, at a very slight expense, be made a useful and valuable arm.

To enable others skilled in the art to make and use the invention of the said JAMES H. MERRILL, the subjoined description is furnished, in connection with the accompanying drawings.

In the first place the hole through which the charge is inserted in the Jenks gun is plugged up, and the top *a* of the plug may project above the barrel B sufficiently far to form a catch for the lever A when it is brought down upon the barrel, and to make the point or forward end of the lever A of proper form to drop over the plug *a*, a piece, *b*, may be brazed onto it, which admits of a countersink, *c*, on the under side of said forward end, and a groove on its top in range with the sights of the gun.

Secondly, cut away the part *d* behind the barrel and lay a piece of curved metal below the side pieces heretofore used. This opens out a part of the gun heretofore closed up, and forms a large open chamber, into which the cartridge may be dropped, and from whence it is taken by the piston and run into the bore of the gun.

Thirdly, cut away the shoulder *e* where the toggle-lever C is pivoted to the main lever A, which allows both levers, as well as the piston D, to come further back, and thus leave more room between the fore part of the piston and the rear of the barrel for the easy insertion of the cartridge; but in cutting away the part behind the rear of the barrel the part which served as a guide to the piston would be removed, and consequently something must be done to restore this guiding property, else the piston will jam or twist and not freely and truly enter the bore of the gun. To effect this object, the said MERRILL formed upon the toggle-lever C a groove, *f*, into which a stud or pin, *i*, set in the breech-frame projected, and which pin, as the piston was run up toward the barrel, tended to draw down the toggle-lever and keep it more in line with the piston D. The piston, by means of this guiding contrivance, moves perfectly free and easy and without binding or cramping. The lever A may require widening out at the part which covers the opening *d*, so as to protect said opening, which may be done by welding on side pieces or spreading out the lever. A Jenks gun thus altered is capable of being loaded from the rear by a cartridge, instead of with loose powder and ball through an opening perpendicular to the bore of the gun.

There are no parts of the Jenks gun which may be said to be removed and replaced by others, the gun having within itself the elements for converting it into a cartridge-gun by alteration of its parts and a reorganization of them. Nor is there much added to it. The whole change can be readily and cheaply made, and a gun which has been laid aside by the Government as useless, owing to the manner of loading it, may be made available as a cartridge-loader, and thus be profitably used.

We make no claim to the parts of this gun when they are arranged as in the Jenks gun, as the invention of the said MERRILL consisted mainly in converting the Jenks gun from a loose powder and ball loader to a cartridge-loader, and by this means to render valuable and useful several thousand stand of arms that are now laid aside as not available for the service.

What is claimed under this patent as the invention of JAMES H. MERRILL is—

Converting what is known as the "Jenks Gun" from a loose powder and ball loader to a cartridge-loader by closing up the opening through which that gun was loaded, cutting away and opening out in rear of the barrel, so as to load at the rear end of the bore, and allowing the lever, toggle, and piston to come far enough back to admit a cartridge to be dropped in behind the bore, and thence run up into the chamber, as herein set forth.

THE MERRILL PATENT FIRE ARMS
MANUFACTURING COMPANY,
By JAMES H. MERRILL,
*Their President.*

Witnesses:
JOHN M. FRIEDRICH,
MAJ. T. SPARKS.